United States Patent [19]

Bach

[11] Patent Number: 4,576,004
[45] Date of Patent: Mar. 18, 1986

[54] BRAKING DEVICE WITH OPPOSITELY MOVABLE DIAPHRAGMS

[75] Inventor: Lloyd G. Bach, South Bend, Ind.

[73] Assignee: Allied Corporation, Morristown, N.J.

[21] Appl. No.: 627,012

[22] Filed: Jul. 2, 1984

[51] Int. Cl.[4] .............................................. B60T 13/00
[52] U.S. Cl. ..................... 60/547.1; 60/581; 91/376 R; 92/75; 188/356; 303/114
[58] Field of Search ................. 303/114, 119, 92, 100, 303/50–56, 6 R, 6 A; 92/75, 50, 69, 70–74; 91/459, 376, 369, 275, 361; 60/562, 581, 593, 545, 547.1; 188/345, 356, 357–359, 181

[56] References Cited

U.S. PATENT DOCUMENTS

| | | | |
|---|---|---|---|
| 3,470,695 | 10/1969 | Kilb | 188/357 X |
| 3,503,655 | 3/1970 | Heimler | 303/114 |
| 3,556,608 | 1/1971 | MacDuff et al. | 303/114 |
| 3,729,235 | 4/1973 | Bach et al. | 303/114 |
| 3,795,426 | 3/1974 | Sisson | 303/114 |
| 4,071,283 | 1/1978 | Van Howe | 303/114 |
| 4,096,696 | 6/1978 | Van Howe | 188/357 X |
| 4,387,626 | 6/1983 | Myers | 91/376 R |
| 4,438,629 | 3/1984 | Sato et al. | 92/75 X |

Primary Examiner—Douglas C. Butler
Attorney, Agent, or Firm—Ken C. Decker

[57] ABSTRACT

A brake system includes a brake booster coupled to a front wheel brake cylinder. The brake booster substantially defines a pair of rear wheel brake cylinders separate from the front wheel brake cylinder so that a pair of diaphragms are separated during braking to generate a power assist for the front and rear brake cylinders. A control valve cooperates with the brake booster to alter the power assist for the rear brake cylinders in response to a signal from an electronic control unit.

8 Claims, 1 Drawing Figure

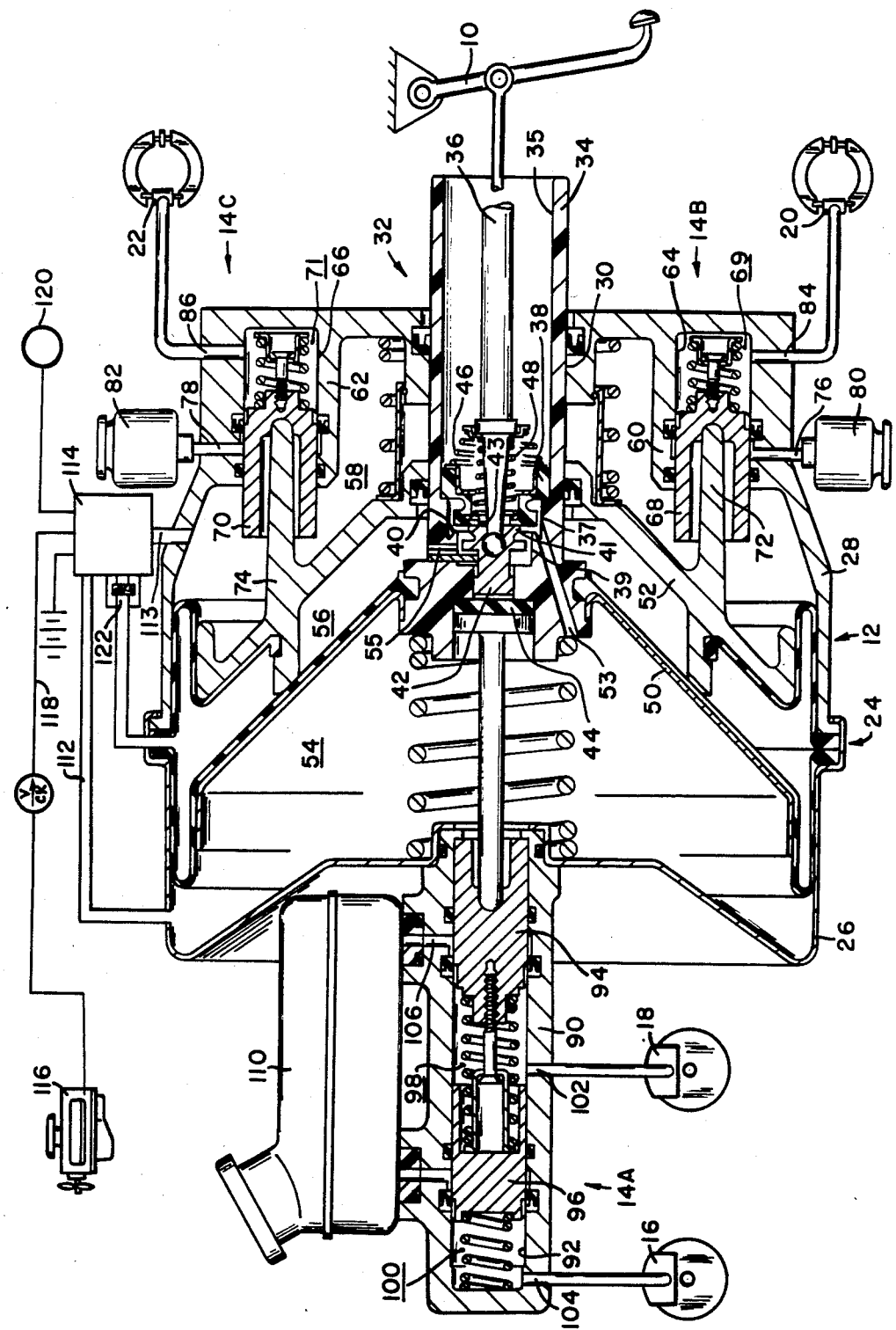

BRAKING DEVICE WITH OPPOSITELY MOVABLE DIAPHRAGMS

The present invention relates to a brake system wherein a vacuum booster is coupled to a master cylinder to generate a power assist for communicating fluid pressure from the master cylinder to a pair of front brakes and a pair of rear brakes. The vacuum booster includes a pair of diaphragms to separately generate a power assist for the pair of front brakes and the pair of rear brakes, and a control valve is optionally provided to cooperate with the one diaphragm associated with the rear brakes to alter the power assist for the one diaphragm in response to a skidding condition for the pair of rear brakes.

In U.S. Pat. No. 4,387,626, issued June 14, 1983 to Lawrence R. Myers, a tandem brake booster is disclosed wherein a pair of diaphragms are movable in opposite directions during braking to generate a power assist for a master cylinder coupled to the tandem brake booster. The master cylinder is disposed adjacent a front shell for the booster housing and the operation of the tandem brake booster results in separate additive forces being imparted to a primary piston in the master cylinder. If the primary piston is seized to the master cylinder housing as a result of contaminates wedging between the housing and primary piston, neither of the separate additive forces will be transmitted to the master cylinder to effectuate braking. In view of this potential failure, it is desireable to separate the forces generated by each diaphragm and also to separate the brake circuits between the front brakes and the rear brakes. Consequently, if the primary piston of either brake circuit is seized, the other brake circuit will continue to function during braking. In addition, with the brake circuits separated between front and rear brakes, it is also desireable to provide an anti-skid system for the rear brakes by incorporating the anti-skid system in the brake booster independently of the rear brakes. With these features added to such a tandem brake booster, a reliable brake system is provided to offset numerous modes of failure.

The present invention provides a brake system comprising a vacuum brake booster and master cylinder assembly, in combination, wherein the booster generates a power assist to actuate the master cylinder and communicate fluid pressure to a plurality of vehicle brake assemblies, the booster defining a housing with a pair of movable diaphragms therein; the diaphragms cooperating with the housing to substantially define three pressure cavities, and a valve assembly operable during braking to create a fluid pressure differential across the pair of diaphragms which biases the latter to move in opposite directions, and the housing includes a front shell adjacent a first master cylinder with one of the pair of diaphragms operatively coupled to the first master cylinder via suitable means so that movement of the one diaphragm generates fluid pressure in the first master cylinder for communication with one of the brake assemblies, characterized in that the housing includes a rear shell supporting a second master cylinder remote from the first master cylinder and the other diaphragm is operatively coupled to the second master cylinder to generate fluid pressure in the second master cylinder in response to movement of the other diaphragm.

It is an advantage of the present invention that a power assist for the front brakes is independent from a power assist for the rear brakes.

The sole FIGURE schematically illustrates a brake system with a brake booster and master cylinder assembly depicted cross-sectionally.

A brake pedal 10 is operable by a vehicle operator during braking to control vehicle deceleration. The brake pedal 10 is connected with a vacuum brake booster 12 which generates a power assist for a master cylinder assembly comprising front brake cylinder 14A, a first rear brake cylinder 14B and a second rear brake cylinder 14C. Fluid pressure is generated in each cylinder for communication to a pair of front brakes 16, 18 and a pair of rear brakes 20, 22.

The brake booster 12 includes a housing 24 with a front shell 26 and a rear shell or casing 28. The front shell 26 supports the front brake cylinder 14A and the rear shell 28 defines an aperture 30 movably receiving a valve assembly 32. The valve assembly comprises a valve body 34 with an opening 35 receiving a stem 36 connected to the brake pedal 10, a flexible valve member 38 fixed at one end to the valve body 34 and opposing a seat 40 defined on the valve body 34, and a plunger 42 attached to the end of the stem 36 adjacent a reaction disc 44. The opening 35 leads to a first annulus 37 and a second smaller annulus 39 which are separated by seat 40. A first spring 46 extends between the fixed end of valve member 38 and the plunger 36 while a second spring 48 extends between the flexible end of the valve member 38 and the plunger 36. The valve body supports a front diaphragm 50 extending radially outwardly therefrom to sealingly engage the housing 24 at the connection of the front and rear shells. A rear diaphragm 52 also sealingly engages the housing 24 at the connection and extends radially inwardly to movably and sealingly engage the valve body 34. The diaphragms 50 and 52 cooperate with the housing to substantially define a plurality of pressure cavities 54, 56 and 58 for a purpose to be described hereinafter. A passage 53 in valve body 34 communicates cavity 54 with the first annulus 37 and a passage 55 communicates cavity 56 with the second annulus 39. The rear shell 28 is provided with a pair of bosses 60 and 62 defining bores 64 and 66, respectively. A pair of pistons 68 and 70, respectively, are movably disposed in the bores 64 and 66 so that projections 72 and 74 extending rearwardly from the rear shell 52 are engageable with the pistons to control movement thereof in the bores 64 and 66. The pistons 68 and 70 cooperate with the rear shell to form pressure chambers 69 and 71.

The rear shell 28 includes a pair of inlet ports 76 and 78 communicating fluid reservoirs 80 and 82 with bores 64 and 66, respectively. A pair of outlet ports 84 and 86 communicate the pressure chambers 69 and 71 with the pair of rear brakes 20 and 22, respectively, via suitable conduits. The pressure chamber 69 cooperates with the piston 68 to substantially define the first rear brake cylinder 14B while the pressure chamber 71 cooperates with the piston 70 to substantially define the second rear brake cylinder 14C.

The front brake cylinder 14A includes a housing 90 coupled via suitable means with the front shell 26. The housing 90 forms a bore 92 receiving a pair of pistons 94 and 96 which cooperate with the housing to form a pair of pressure chambers 98 and 100. The pressure chamber 98 communicates via outlet port 102 with the front brake 18 while the pressure chamber 100 communicates via outlet port 104 with the front brake 16. Suitable inlet ports 106 and 108 communicate fluid from a reservoir 110 to the bore 92.

The pressure cavity 54 communicates with the pressure cavity 58 via conduits 112 and 113. A control valve 114 intersects the conduits 112 and 113 to control communication of vacuum from a source such as an engine 116 via conduit 118 to cavities 54 and 58. The control valve 114 is operated in response to input from an electronic control unit 120 which functions to measure whether the rear wheels of the vehicle are rotating or skidding during braking.

The brake booster is illustrated in the rest position with suitable springs cooperating with the pair of diaphragms 50, 52 and the pistons 68, 70, 94 and 96 to bias the same to their rest positions. The flexible valve member 38 is spaced from seat 40 in the rest position so that vacuum in cavity 54 is also in communication with cavity 56 via opening 53, annulus 37, annulus 39 and opening 55. The control valve in a non-braking condition opens conduits 112 and 113 to conduit 118 so that vacuum pressure exists in all three pressure cavities. During a brake application, the pedal 10 is pivoted in a clockwise direction moving stem 36 toward the dynamic reaction disc 44. The plunger 42 moves with the stem to engage the valve member 38 with the seat 40 to close opening 55 from opening 53 and at the same time isolate annulus 37 from annulus 39. Further movement of the stem 36 separates the plunger 42 from the valve member 38 so that atmospheric air pressure is free to communicate with pressure cavity 56 opening 35, a center aperture 43 on valve member 38, annulus 39 and opening 55. At this time vacuum pressure remains in pressure cavities 54 and 58 so that a pressure differential exists across diaphragms 50 and 52. The diaphragm 50 is biased by the pressure differential to move in the direction of the front brake cylinder while the diaphragm 52 is biased by its associated pressure differential to move in the direction of the rear shell 28. Movement of the diaphragm 50 moves pistons 94 and 96 in the front brake cylinder to generate fluid pressure in pressure chambers 98 and 100 so that the front brakes 16 and 18 are applied. Movement of the diaphragm 52 moves the pistons 68 and 70 in the bores 64 and 66 with a fluid pressure build up in chambers 69 and 71 so that the rear brakes 20 and 22 are applied.

In the event the engine 116 should shut off during braking so that vacuum is unavailable from the manifold, the stem 36 and plunger 42 are manually advanced in the direction of the front brake cylinder to manually generate fluid pressure for the front brakes even though the rear brakes 20 and 22 would not function as they are solely vacuum operated.

With the rear brakes operated independently of the front brakes, it is possible to provide the electronic control unit 120 and the control valve 114 for the purpose of reducing rear wheel lockups. For example, if the rear wheels stop rotating during braking such that an imminent skidding condition exists, the electronic control unit is operable to alter the setting for the control valve so that the pressure cavity 56 is communicated to the pressure cavity 58 via control valve inlet 122. As a result the same pressure exists on both sides of the diaphragm 52, so that the diaphragm 52 returns to its rest position to relieve the fluid pressure generated for the rear brakes thereby avoiding the skidding condition. This anti-skid cycle is repeated frequently in response to the operation of the electronic control unit and the anti-skid cycle is operated independently from the front brake cylinder 14A and its power assist via diaphragm 50.

I claim:

1. A brake system comprising a vacuum brake booster and master cylinder assembly, in combination, wherein the booster generates a power assist to actuate the master cylinder and communicate fluid pressure to a plurality of vehicle brake assemblies, the booster defining a housing with a pair of movable diaphragms therein; the diaphragms cooperating with the housing to substantially define three pressure cavities, and a valve assembly operable during braking to create a fluid pressure differential across the pair of diaphragms which biases the latter to move in opposite directions, and the housing includes a front shell adjacent a first master cylinder with one of the pair of diaphragms operatively coupled to the first master cylinder via suitable means so that movement of the one diaphragm generates fluid pressure in the first master cylinder for communication with one of the brake assemblies, characterized in that the housing includes a rear shell supporting a second master cylinder remote from the first master cylinder and the other diaphragm is operatively coupled to the second master cylinder to generate fluid pressure in the second master cylinder in response to movement of the other diaphragm.

2. The brake system of claim 1 in which the rear shell defines a pressure chamber receiving a piston and the other diaphragm engages the piston to move the latter during braking.

3. The brake system of claim 1 in which the other diaphragm sealingly and movable engages the valve assembly.

4. The brake system of claim 1 in which a control valve communicates with at least one of the pressure cavities to alter the fluid pressure between the two pressure cavities in response to vehicle deceleration during braking.

5. The brake system of claim 1 in which said first master cylinder includes an axially extending bore receiving a pair of pistons, said second master cylinder includes a pair of axially extending bores parallel with each other, and a single piston is disposed within each parallel bore.

6. The brake system of claim 1 in which said other diaphragm cooperates with a piston to move the latter opposite to said one diaphragm during braking.

7. The brake system of claim 6 in which said other diaphragm includes a projection extending axially away from the one diaphragm in order to connect said other diaphragm with said piston.

8. The brake system of claim 1 in which said one diaphragm generates a first force during braking and the first force is operable to provide a power assist for a pair of front brake assemblies for a vehicle, said other diaphragm generates a second force during braking and the second force is operable to provide a power assist for a pair of rear brake assemblies for the vehicle.

* * * * *